(No Model.)
L. GRATHWOL.
MACHINE FOR STAMPING CIGARS.
No. 337,322. Patented Mar. 2, 1886.
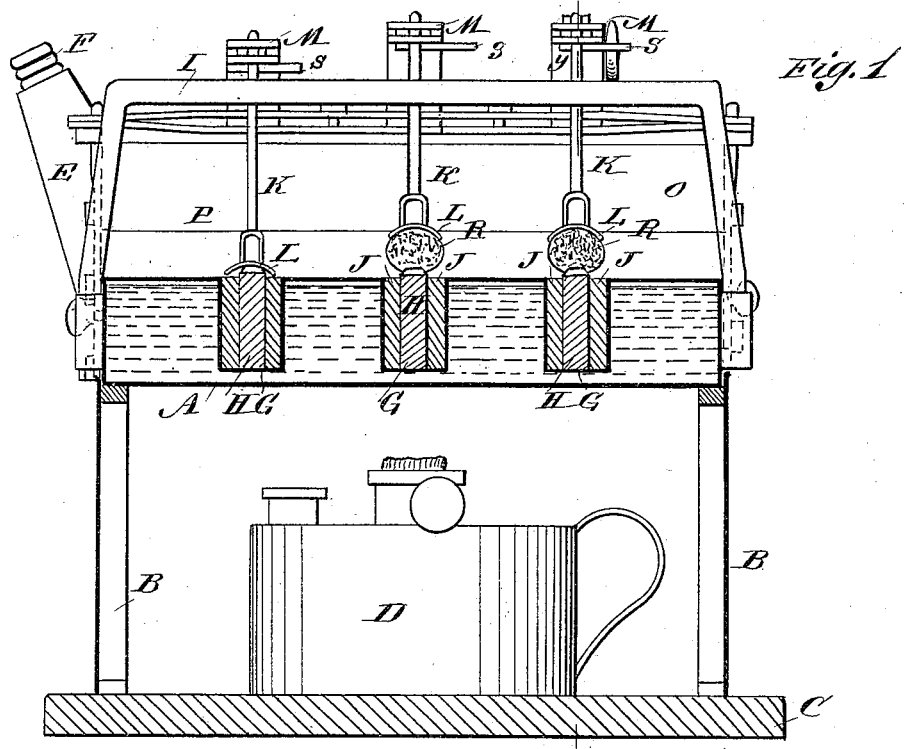
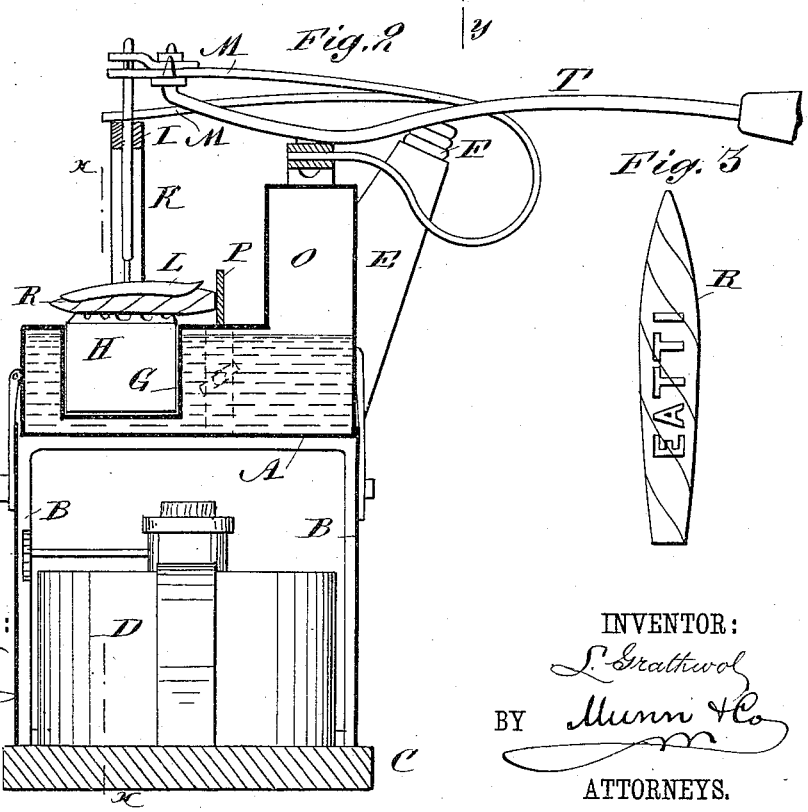
WITNESSES:
C. Neveux
C. Sedgwick
INVENTOR:
L. Grathwol
BY Munn & Co
ATTORNEYS.

UNITED STATES PATENT OFFICE.

LEOPOLD GRATHWOL, OF TROY, NEW YORK.

MACHINE FOR STAMPING CIGARS.

SPECIFICATION forming part of Letters Patent No. 337,322, dated March 2, 1886.

Application filed February 3, 1885. Serial No. 154,822. (No model.)

*To all whom it may concern:*

Be it known that I, LEOPOLD GRATHWOL, of Troy, in the county of Rensselaer and State of New York, have invented a new and Improved Machine for Stamping Cigars, of which the following is a full, clear, and exact description.

The object of my invention is to provide a new and improved machine for impressing trade-marks, names, initials, &c., in cigars of all kinds.

The invention consists in the combination, with a vessel adapted to contain hot water and provided with pockets for holding type, of plates above the types, and springs for pressing the said plates toward the types.

Reference is to be had to the accompanying drawings, forming part of this specification, in which similar letters of reference indicate corresponding parts in all the figures.

Figure 1 is a longitudinal sectional elevation of my improved machine for stamping cigars, on the line $x\,x$, Fig. 2. Fig. 2 is a cross-sectional elevation of the same on the line $y\,y$, Fig. 1. Fig. 3 is a side view of a stamped cigar.

A flat closed vessel, A, adapted to contain water, is supported by standards B on a base, C, and on the said base a lamp, D, is placed for heating the water in the vessel A. A neck, E, projects upward from one end of the vessel, and through the said neck the vessel A is filled, and then a screw-cap, F, is screwed on the said neck E, to prevent the steam from escaping.

In the top of the vessel A a series of pockets, G, are formed for receiving the type-blocks H, which are placed upright, and are held in place and position in the pockets by wedge pieces or blocks J, inserted between the sides of the said type-blocks and the sides of the pockets. The faces of the types must project some distance above the top of the vessel A.

A U-shaped bar or frame, I, has its ends secured to the ends of the vessel A and its top piece extended over the pockets G some distance above the same. Above each pocket G a rod, K, is arranged to move vertically in the frame I, and to the lower end of each rod K a plate, L, is secured, which has its under side concaved transversely to fit against a cigar.

To the upper end of each rod K the free end of a spring, M, is secured, which has its other end secured on a raised part, O, of the vessel A. A gage-strip, P, is placed edgewise on the top of the vessel between the pockets G and the raised part O, the ends of the gage being held on the ends of the vessel A by set-screws. The gage-strip can thus be adjusted a greater or less distance from the rear ends of the pockets G.

From the free end of each spring M an apertured lug, S, projects laterally.

The operation is as follows: The free ends of the springs M are raised by means of the lever T, which is rested on the raised part O, and the prong or hook on its free end passed into the aperture in the lug S. The opposite end of the lever being pressed down, the free end of the spring and the curved plate L are raised. The cigar is then placed on the faces of the types H of one pocket, and the spring M being released it presses the plate L on the cigar R below it, and thereby the cigar is pressed on the types, which are forced more or less into the cigar. Cigars are successively placed upon the three type groups, and after the third cigar has been placed upon the types the first is removed, and so on. The types are heated by the hot water surrounding the pockets G. The names, trade-marks, numbers, &c., appear recessed or sunken in the surfaces of the cigar.

Having thus described my invention, what I claim as new, and desire to secure by Letters Patent, is—

1. In a machine for stamping cigars, the combination, with a series of type-holders, of a series of plates above the types, and of springs for pressing the plates toward the types, substantially as herein shown and described.

2. In a machine for stamping cigars, the combination, with a vessel for containing hot water, of type-holding pockets formed in the top of the said vessel, and plates above the type-pockets, and springs for pressing the plates toward the pockets, substantially as herein shown and described.

3. In a machine for stamping cigars, the combination, with the vessel A, having type-holding pockets G in its top, of the frame I, the rods K, passed through the same, the plates L on the lower ends of the rods K, and the springs M, connected with the upper ends of the rods K, substantially as herein shown and described.

4. In a machine for stamping cigars, the combination, with the vessel A, having type-holding pockets G, of the frame I, the rods K, the plates L, the springs M, and the apertured lugs S, substantially as herein shown and described.

5. In a machine for stamping cigars, the combination, with the vessel A, having the raised portion O and the type-holding pockets G, of the frame I, the rods K, the plates L, and the springs M, substantially as herein shown and described.

6. In a machine for stamping cigars, the combination, with the vessel A, of the type-holding pockets G, plates above the pockets, springs for pressing them down, and the adjustable gage-plate P, extending over the top of the vessel A, substantially as herein shown and described.

LEOPOLD GRATHWOL.

Witnesses:
 LEWIS KNAUF,
 CHARLES J. ULRICH.